Aug. 18, 1925.

G. N. HEIN

LIGHT SHADING DEVICE

Filed July 24, 1923

1,550,252

INVENTOR.
George N. Hein
BY
ATTORNEYS.

Patented Aug. 18, 1925.

1,550,252

UNITED STATES PATENT OFFICE.

GEORGE N. HEIN, OF SAN FRANCISCO, CALIFORNIA.

LIGHT-SHADING DEVICE.

Application filed July 24, 1923. Serial No. 653,458.

*To all whom it may concern:*

Be it known that I, GEORGE N. HEIN, a citizen of the United States, residing at the city and county of San Francisco and State of California, have invented certain new and useful Improvements in Light-Shading Devices, of which the following is a specification.

This invention relates to a light shading device, the use of which enables a vehicle operator to obtain a better vision of the road or highway when driving by enabling him to reduce or eliminate the glare of the sun's rays from striking his eyes, which is exceedingly annoying.

The objects of this invention are to provide a light shading device extending in advance of the vehicle operator, and the angle of which may be quickly adjusted from the rear of the vehicle windshield, and one wherein the adjusting means locks the light shading device in its adjusted angular position. A further object is to provide a member affording a modified transparency for positioning at the free edge of the light shading member, and which is capable of movement into and out of operative position at will by the operator, from a point in rear of the vehicle windshield to afford a reduction of the glare of approaching headlights. A further object is to provide a novel form of mounting for the light shading member, and to provide a construction adapted for use in connection with windshields of various widths.

The present illustration discloses the installation in connection with the main driving shield. It is to be understood, however, that other installations are capable of accomplishment.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1:
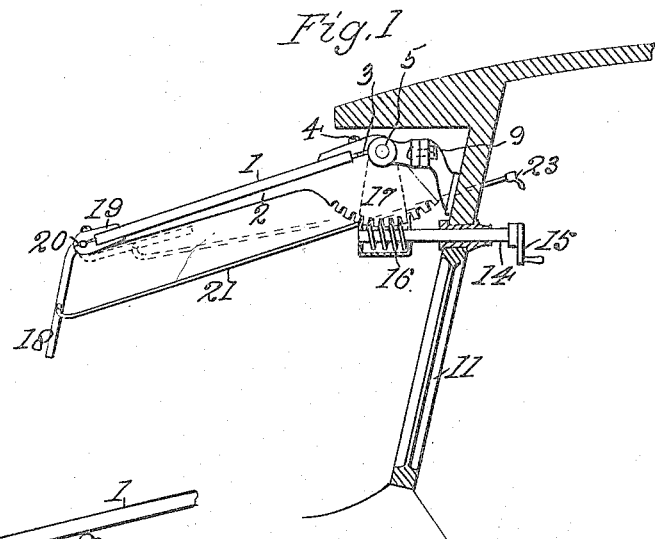
Fig. 1 is a side view of an embodiment of my invention illustrating a bracket construction designed for attachment to a vehicle having a fixed top, or of the enclosed type; the sunshade operating means and the vehicle top and windshield being illustrated in section.
Figure 5:
Fig. 5 is a view of the supporting guide for the operating rod connected with the light modifying member.
Figure 3:
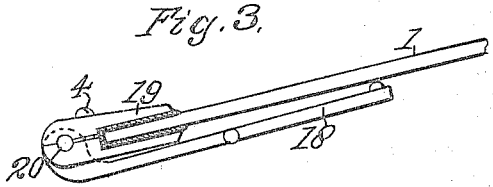
Fig. 3 is a view in end elevation of the driving member folded beneath the light shading member.
Figure 2:
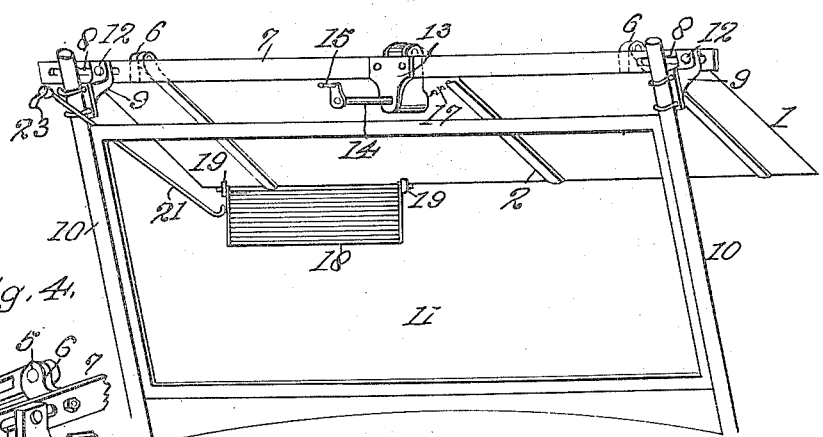
Fig. 2 is a view in elevation forwardly through a windshield illustrating an embodiment of my invention for attachment to the windshields of the well known open types of cars.
Figure 4:
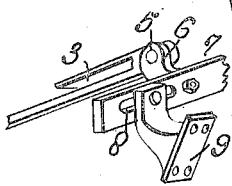
Fig. 4 is a view in perspective of one of the end attaching brackets illustrated in Fig. 2.

Referring more particularly to the several views of the drawings wherein like characters of reference designate corresponding parts, 1 indicates a light shading member preferably oblong in plan and preferably of light weight material, opaque in character, the under surface of which will not cause reflections. The member 1 is of a length substantially corresponding to the width of the vehicle windshield, and the same is carried by arms 2 slotted at their upper ends as at 3, and carrying clamp screws 4 which are adapted to be adjusted to grip one edge of the member 1 in the slots. The arms at one end are fulcrumed as at 5 to the ears 6 carried on the outer face of a supporting bar 7. The bar is preferably slotted adjacent its ends as at 8, and in Fig. 1 the same is secured through brackets 9 to the permanent portion 10 adjacent the windshield 11 of permanent top of the conventional type. In this installation bolts 12 are carried by the brackets, and passing through the slots 8 are secured to unite the ends of the supporting bar to the respective brackets. At a point between its points of support, the bar 7 carries a worm casing 13, into which extends an axially rotatable operating shaft 14, the inner end of which projects rearwardly through the vehicle windshield and carries a crank 15. The forward end of said shaft carries a worm 16 which engages with the segment 17 formed on the inner end of the center arm 2.

It will be observed that the vehicle operator by grasping the handle 15 and rotating the shaft 14 is enabled to quickly change the angle of the light shading member, and thus obtain the maximum benefit therefrom under all conditions. It will also be observed that the engagement of the worm and rack will retain the light shading member in its angular adjusted position.

To afford greater comfort and safety to the vehicle driver particularly when driving against the sun, or against oncoming headlights, I provide at the free edge of the light shading member, a suitable elongated member 18 of modified transparency preferably of glass, and the same is clamped or secured in any suitable manner as by brackets 19 to the free edge of the light shading member, and is mounted to fulcrum on pivots 20 into and out of operative position.

As illustrated, the member 18 is adapted for movement in a position to depend from the free edge of the light shading member 1, and also to be varied or pivotally moved in a position to lie adjacent one face thereof when it is out of use.

To conveniently operate the member 18, I pivotally connect therewith one end of a rod 21, the other end of which extends rearwardly through the windshield and is supported by a guide hook 22. A handle 23 on the rod 21 is within convenient reach of the operator enabling him to quickly throw the member 18 into and out of operative position as driving conditions require.

The member 18 is illustrated as of a size to depend only from a portion of the light shading member, leaving the remainder of the edge free and unobstructed enabling the driver or vehicle operator to position the member to intercept the glare of the headlights of an approaching vehicle without in any manner impairing the driving vision beneath the edge of the remaining portion of the light shading member.

Having thus described my invention, what I claim as new and desire to protect by Letters Patent of the United States is:—

1. In combination with a light shading member extending forwardly of a vehicle windshield of a nontransparent modifying member depending from and detachably secured to the light shading member near its forward edge and means extending rearwardly from the modifying member and operable from the rear of the windshield for adjusting the modifying member angularly relatively to the light shading member.

2. In a light shading device for vehicle windshields, including a bar for disposing horizontally across the upper edge of the shield, a pair of members mounted for longitudinal adjustment at each end of the bar, and adapted for securing opposite ends of the bar to a support, a nontransparent light shading member fulcrumed at one edge to the opposite ends of the bar to project forwardly of the windshield, a rack associated with the light shading member, a worm intermeshing with said rack, a rotatable shaft mounting at one end said worm and extending to a point rearwardly of the windshield, a modifying member detachably secured to the outer edge of the light shading member and depending therefrom, and an operating member extending therefrom rearwardly of the windshield for swinging said modifying member against one face of the light shading member into inoperative position.

3. In combination with a light shading member extending forwardly of a vehicle windshield of a nontransparent modifying member hingedly secured at its upper edge to the light shading member, and an operating connection extending from said member rearwardly of the windshield whereby said modifying member may be moved into and from operative position adjacent one face of the light shading member, and into and from an operative position depending from the light shading member.

4. In combination with a light shading member pivotally mounted at one edge to extend forwardly of a vehicle windshield, a modifying member hingedly secured to the light shading member to depend therefrom and for pivotal movement to inoperative position adjacent one face of the light shading member, means for adjusting the angle of the light shading member, and means for adjusting the angle of the modifying member, said adjusting means being independently operatable from the rear of the vehicle windshield.

5. In combination with a light shading member extending forwardly of a vehicle windshield, of a non-transparent modifying member pivotally mounted to depend below the light shading member adjacent to its forward edge and to pivot with one face substantially parallel with one face of the light shading member, and means extended rearwardly from the modifying member for adjusting the same angularly relatively to the light shading member.

In testimony whereof I have signed my name to this specification.

GEORGE N. HEIN.